(12) United States Patent
Brettschneider et al.

(10) Patent No.: US 9,766,144 B2
(45) Date of Patent: Sep. 19, 2017

(54) POLYMER LAYER SYSTEM PRESSURE SENSOR DEVICE, AND POLYMER LAYER SYSTEM PRESSURE SENSOR METHOD

(75) Inventors: Thomas Brettschneider, Leonberg (DE); Christian Dorrer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 531 days.

(21) Appl. No.: 14/239,802

(22) PCT Filed: Jul. 3, 2012

(86) PCT No.: PCT/EP2012/062874
§ 371 (c)(1),
(2), (4) Date: May 30, 2014

(87) PCT Pub. No.: WO2013/029836
PCT Pub. Date: Mar. 7, 2013

(65) Prior Publication Data
US 2014/0290373 A1  Oct. 2, 2014

(30) Foreign Application Priority Data
Aug. 31, 2011  (DE) .................. 10 2011 081 887

(51) Int. Cl.
*G01L 7/00* (2006.01)
*B01L 3/00* (2006.01)
*G01L 9/00* (2006.01)

(52) U.S. Cl.
CPC .......... *G01L 7/00* (2013.01); *B01L 3/502707* (2013.01); *G01L 9/0045* (2013.01);
(Continued)

(58) Field of Classification Search
CPC ......... B01L 3/502707; B01L 2200/146; G01L 9/0045; G01L 9/0052; G01L 9/0072;
(Continued)

(56) References Cited

U.S. PATENT DOCUMENTS

| 4,227,419 A | * | 10/1980 | Park .......................... G01L 9/12 361/283.4 |
| 4,426,673 A | * | 1/1984 | Bell ....................... G01L 9/0075 29/25.41 |

(Continued)

FOREIGN PATENT DOCUMENTS

| CN | 1845327 A | 10/2006 |
| CN | 101115982 A | 1/2008 |

(Continued)

OTHER PUBLICATIONS

Kohl et al., A microfluidic experimental platform with internal pressure measurements, Sensors and Actuators A, 2005, pp. 212-221, vol. 118, Elsevier B.V.
(Continued)

*Primary Examiner* — Lisa Caputo
*Assistant Examiner* — Tran M Tran
(74) *Attorney, Agent, or Firm* — Maginot, Moore & Beck LLP (57) ABSTRACT

A polymer layer system pressure sensor device includes a first polymer substrate having a first cavity and a first polymer membrane stretched over the first cavity. The first polymer membrane is configured to be deflected dependent on a pressure in the first cavity. The device further includes a first membrane metallization layer applied to the first polymer membrane above the first cavity. The first membrane metallization layer is configured to be deflected together with the first polymer membrane dependent on the pressure in the first cavity. The device further includes a second polymer substrate, arranged over the first polymer membrane, a second cavity, arranged over the first cavity, and a second polymer membrane, stretched over the second cavity. The device further includes a second membrane metallization layer applied to the second polymer membrane within the second cavity and includes a third polymer substrate arranged over the second polymer membrane.

12 Claims, 4 Drawing Sheets

US 9,766,144 B2
Page 2

(52) U.S. Cl.
CPC .......... *G01L 9/0052* (2013.01); *G01L 9/0072* (2013.01); *B01L 2200/146* (2013.01); *B01L 2300/0663* (2013.01)

(58) Field of Classification Search
CPC ..... G01L 9/0086; G01L 9/007; G01L 9/0055; G01L 2009/0069; G01L 13/025; G01L 13/026
USPC ........................................................ 73/718
See application file for complete search history.

(56) References Cited

U.S. PATENT DOCUMENTS

| | | | | |
|---|---|---|---|---|
| 4,479,392 A * | 10/1984 | Froeb | ................ | G01L 1/14 338/47 |
| 4,542,435 A * | 9/1985 | Freud | ................ | G01L 9/0073 361/283.4 |
| 4,586,109 A * | 4/1986 | Peters | ................ | G01L 9/0073 29/25.41 |
| 4,701,826 A * | 10/1987 | Mikkor | ................ | G01L 9/0073 361/283.4 |
| 4,716,492 A * | 12/1987 | Charboneau | ................ | G01L 9/0075 361/283.4 |
| 4,730,496 A * | 3/1988 | Knecht | ................ | G01L 9/0073 361/283.4 |
| 4,773,972 A * | 9/1988 | Mikkor | ................ | B81C 1/00301 148/DIG. 12 |
| 4,831,492 A * | 5/1989 | Kuisma | ................ | G01L 9/0073 361/283.4 |
| 4,852,851 A * | 8/1989 | Webster | ................ | F16K 7/17 137/597 |
| 4,862,317 A * | 8/1989 | Kuisma | ................ | G01L 9/0073 361/283.1 |
| 4,864,463 A * | 9/1989 | Shkedi | ................ | G01L 19/02 361/283.4 |
| 4,991,283 A * | 2/1991 | Johnson | ................ | G01D 5/14 156/89.12 |
| 5,050,035 A * | 9/1991 | Hegner | ................ | G01L 9/0075 29/25.42 |
| 5,171,132 A * | 12/1992 | Miyazaki | ................ | F04B 43/046 417/322 |
| 5,186,054 A * | 2/1993 | Sekimura | ................ | B60C 23/0408 361/283.4 |
| 5,189,591 A * | 2/1993 | Bernot | ................ | H01G 5/16 361/283.4 |
| 5,189,916 A * | 3/1993 | Mizumoto | ................ | G01L 9/0075 361/283.4 |
| 5,211,058 A * | 5/1993 | Fukiura | ................ | G01L 9/0072 29/25.41 |
| 5,349,492 A * | 9/1994 | Kimura | ................ | G01L 9/0075 361/283.4 |
| 5,486,976 A * | 1/1996 | Charboneau | ................ | G01L 9/0075 361/283.4 |
| 5,499,158 A * | 3/1996 | Bishop | ................ | G01L 9/0075 361/283.4 |
| 5,525,280 A * | 6/1996 | Shukla | ................ | G01L 9/0075 156/233 |
| 5,528,452 A * | 6/1996 | Ko | ................ | G01L 9/0073 361/283.4 |
| 5,756,899 A * | 5/1998 | Ugai | ................ | G01F 1/383 73/714 |
| 5,792,957 A * | 8/1998 | Luder | ................ | G01L 9/0075 361/283.4 |
| 5,844,769 A * | 12/1998 | Maier | ................ | G01L 23/24 361/283.1 |
| 5,920,015 A * | 7/1999 | Hallberg | ................ | G01L 9/0075 361/283.4 |
| 6,111,520 A * | 8/2000 | Allen | ................ | B60C 23/0408 324/655 |
| 6,252,759 B1 * | 6/2001 | Lange | ................ | G01L 9/0075 361/283.1 |
| 6,278,379 B1 * | 8/2001 | Allen | ................ | B60C 23/0408 324/655 |
| 6,387,318 B1 * | 5/2002 | Xue | ................ | G01L 9/0075 264/642 |
| 6,460,416 B1 * | 10/2002 | Igel | ................ | G01L 9/0073 73/718 |
| 6,615,665 B1 * | 9/2003 | Flogel | ................ | G01L 9/0073 361/283.1 |
| 6,626,046 B2 * | 9/2003 | Taguchi | ................ | G01L 1/205 73/753 |
| 6,661,637 B2 * | 12/2003 | McIntosh | ................ | G01D 5/2417 361/207 |
| 6,667,725 B1 * | 12/2003 | Simons | ................ | H01Q 1/22 340/572.1 |
| 6,715,356 B2 * | 4/2004 | Gerst | ................ | G01L 9/0075 73/715 |
| 6,829,942 B2 * | 12/2004 | Yanai | ................ | A61B 5/113 73/716 |
| 6,848,318 B2 * | 2/2005 | Gerst | ................ | G01L 9/0075 73/715 |
| 6,874,367 B2 * | 4/2005 | Jakobsen | ................ | G01L 19/069 361/283.4 |
| 6,929,974 B2 * | 8/2005 | Ding | ................ | B81B 7/007 257/659 |
| 7,107,855 B2 * | 9/2006 | Bjoerkman | ................ | G01L 9/0044 361/283.4 |
| 7,135,749 B2 * | 11/2006 | Sakai | ................ | G01L 9/0073 257/418 |
| 7,152,479 B2 * | 12/2006 | Krause | ................ | G01L 9/0027 73/715 |
| 7,246,526 B2 * | 7/2007 | Won | ................ | G01L 27/002 73/754 |
| 7,254,008 B2 * | 8/2007 | Xie | ................ | G01N 27/226 361/271 |
| 7,316,163 B2 * | 1/2008 | Grudzien | ................ | G01L 9/0075 361/283.4 |
| 7,353,711 B2 * | 4/2008 | O'Dowd | ................ | G01L 9/0072 73/718 |
| 7,514,000 B2 * | 4/2009 | Gilbert | ................ | B01D 63/087 210/201 |
| 7,607,641 B1 * | 10/2009 | Yuan | ................ | F16K 7/126 137/597 |
| 7,624,643 B2 * | 12/2009 | Grudzien | ................ | G01L 9/0072 73/718 |
| 7,662,653 B2 * | 2/2010 | O'Brien | ................ | B81B 7/007 257/E21.499 |
| 7,677,107 B2 * | 3/2010 | Nunez | ................ | G01L 9/0072 73/718 |
| 7,724,494 B2 * | 5/2010 | Shimanouchi | ................ | H01G 5/38 361/278 |
| 7,796,371 B2 * | 9/2010 | Xie | ................ | G01N 27/226 361/279 |
| 7,986,507 B2 * | 7/2011 | Shimanouchi | ................ | H01G 5/01 361/272 |
| 8,256,299 B2 * | 9/2012 | Mitschke | ................ | G01L 27/007 361/283.4 |
| 8,313,468 B2 * | 11/2012 | Geipel | ................ | A61M 5/158 604/151 |
| 8,388,908 B2 * | 3/2013 | Blaga | ................ | B01L 3/502738 422/502 |
| 8,471,346 B2 * | 6/2013 | Kautzsch | ................ | G01L 9/0052 257/414 |
| 2010/0313652 A1 | 12/2010 | Chandrasekaran | | |
| 2013/0152694 A1 * | 6/2013 | Urvas | ................ | G01L 9/0073 73/724 |

FOREIGN PATENT DOCUMENTS

| | | |
|---|---|---|
| CN | 101180525 A | 5/2008 |
| CN | 102074648 A | 5/2011 |
| DE | 10 2008 002 336 A1 | 12/2009 |
| DE | 10 2009 000 529 A1 | 8/2010 |

(56) References Cited

FOREIGN PATENT DOCUMENTS

KR  10-2007-0045695 A  5/2007
WO  2007/029132 A2  3/2007

OTHER PUBLICATIONS

Liu et al., Micromachined Channel/Pressue Sensor Systems for Micro Flow Studies, The 7th International Conderence Solid-State Sensors and Actuator, Transducers '93, pp. 995-997.
International Search Report corresponding to PCT Application No. PCT/EP2012/062874, mailed Oct. 5, 2012 (German and English language document) (7 pages).
Orth et al.; Elastomer Membrane Pressure Sensors for Microfluidics; 14th International Conference on Miniaturized Systems for Chemistry and Life Sciences; Oct. 3-7, 2010; pp. 1994-1996; ISBN 978-0-9798064-3-8; Groningen, The Netherlands.

* cited by examiner

POLYMER LAYER SYSTEM PRESSURE SENSOR DEVICE, AND POLYMER LAYER SYSTEM PRESSURE SENSOR METHOD

This application is a 35 U.S.C. §371 National Stage Application of PCT/EP2012/062874, filed on Jul. 3, 2012, which claims the benefit of priority to Serial No. DE 10 2011 081 887.1, filed on Aug. 31, 2011 in Germany, the disclosures of which are incorporated herein by reference in their entirety.

The disclosure relates to a polymer layer system pressure sensor device and to a polymer layer system pressure sensor method.

BACKGROUND

Although it can also be applied to any desired micromechanical components, the present disclosure and the problems it addresses are explained on the basis of integrated microfluidic components.

Integrated microfluidic components, for example lab-on-a-chip systems in medical technology, often consist of a polymeric layer structure with enclosed microfluidic structures, such as for example channels and chambers.

Microfluidic components based on polymeric layer systems are versatile in their use on account of the flexible machining and connecting technologies and are a very good platform for realizing disposable components thanks to low costs. To increase the control over processes in complex microfluidic systems, basic information on the physical state of the fluids in such systems is indispensable. Apart from the temperature, the pressures in microfluidic cavities or channels is of importance in particular, in order to be able to set exact flow rates, to be able to detect the blockage of a channel and to monitor the function of valves or pumps.

DE 10 2009 000 529 A1 describes a system for measuring pressure with a measuring channel that is open at one end, a connection with the liquid existing at the open end and a gas being enclosed at the closed end. When there is an increase in the pressure, gas is compressed and the gas-liquid boundary surface is displaced. By observing the meniscus, the change in volume can be determined and, if the initial pressure is known, the current pressure can be determined by applying the Boyle-Mariotte law. For detecting the position of the meniscus, a method which assesses the properties of a light beam that has crossed through the region of the likely position of the meniscus with the aid of deflecting mirrors is proposed.

In Kohl, et al., A Microfluidic Experimental Platform with Internal Pressure Measurements, Sensors and Actuators A 118, (2005), pages 212 to 221, a silicon-based pressure sensor is presented. In it, the increase in the pressure deflects a silicon membrane, the deflection being determined by way of the reflection of a light beam.

Micromachined Channel/Pressure Sensor Systems for Microflow Studies, J. Liu et al., 7th International Conference on Solid-State Sensors and Actuators (Transducers '93) describes a silicon-based microfluidic channel with connected piezoresistive pressure sensors.

DE 10 2008 002 336 A1 discloses a pinch valve and a method for producing it, the pinch valve being used in microfluidic systems.

SUMMARY

The disclosure provides a polymer layer system pressure sensor device according to the description below and a polymer layer system pressure sensor method according to the description below.

Preferred developments are the subject of the below description.

The present disclosure is essentially based on a layer structure consisting of a polymer substrate with a microfluidic cavity, which is covered in one region by a flexible polymer membrane, the rear side having been metallized. At a distance above that there is a further metallization layer, which is connected to a polymer membrane lying above it and to a polymer substrate on top. Between the two metal layers there is a further cavity, which is connected by a channel that is led to the outside to a reference pressure and is filled with a fluid, preferably a gas. In the simplest case, the channel that is led to the outside is connected to the ambient atmosphere. A pressure difference between the microfluidic cavity in the lower polymer substrate and the cavity between the metal layers leads to a deformation of the metallized lower polymer membrane, which can be detected capacitively with the aid of the upper metal layer or, in the case of contact between the two metal layers, can be detected resistively. The metal layers are preferably brought into electrical contact by laterally led-out conductor tracks.

In the case of the device according to the disclosure, the electrical evaluation means that there is no need for a complex external apparatus to determine the pressure, for example an optical readout. As a result, costs and the overall size of an external controlling and reading-out unit can be significantly reduced.

The disclosure is specifically configured for a polymeric layer structure that is versatile in its use for microfluidic systems. The disclosure makes it possible for the pressure to be measured directly in situ. This avoids a falsification of the measuring signal being caused by the fluidic resistance/fluidic capacitance of an otherwise necessary connecting channel or connecting tube to the pressure sensor.

The disclosure can be coupled with additional functional elements. Thus, for example, the metallized lower polymer membrane can at the same time be used as a valve or active element of a diaphragm pump, and consequently monitor the valve or pump function directly.

BRIEF DESCRIPTION OF THE DRAWINGS

Further features and advantages of the present disclosure are explained below on the basis of embodiments with reference to the figures, in which.

DETAILED DESCRIPTION

In the figures, the same reference signs denote elements that are the same or functionally the same.

Figure 1A:
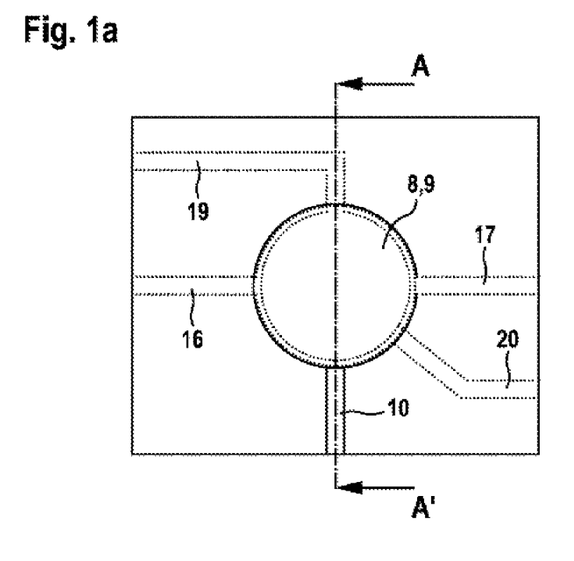
FIGS. 1a)-c) show schematic views for the explanation of a polymer layer pressure sensor device according to a first embodiment of the present invention disclosure, specifically FIG. 1a) in plan view and FIGS. 1b) and 1c) in cross section along the line A-A' in FIG. 1a)
Figure 1B:
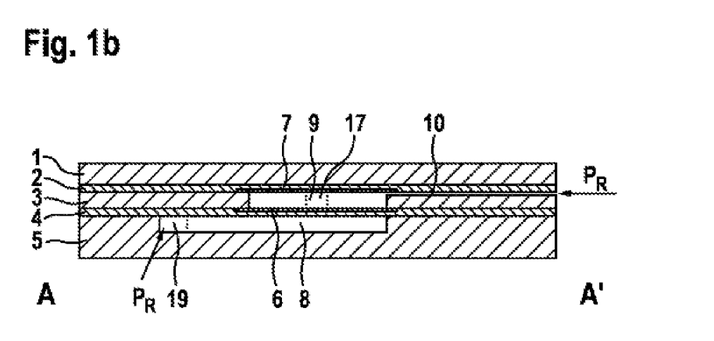
Figure 1C:
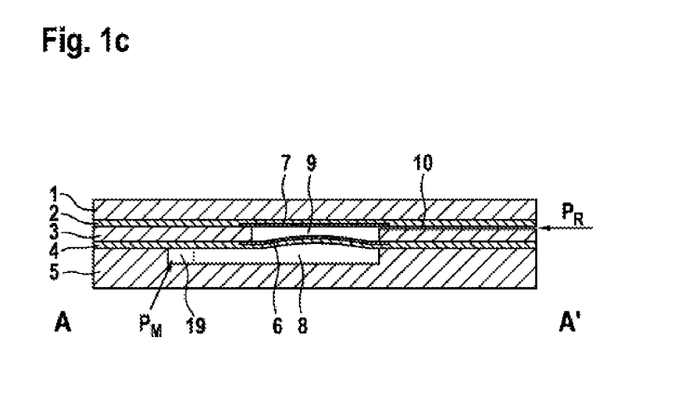

FIGS. 1a)-c) are schematic views for the explanation of a polymer layer pressure sensor device according to a first embodiment of the present disclosure, specifically FIG. 1a) in plan view and FIGS. 1b) and 1c) in cross section along the line A-A' in FIG. 1a).

In FIGS. 1a) to 1c), reference sign 5 denotes a first polymer substrate with a first cavity 8. Provided on the first polymer substrate 5 and the first cavity 8 is an elastic first polymer membrane 4, which is stretched over the first cavity 8 and can be deflected in dependence on a pressure $P_M$ in the first cavity 8.

Provided on the first polymer membrane 4, above and outside the first cavity 8, is a first membrane metallization layer 6, which together with the first polymer membrane 4 can be deflected in dependence on the pressure $P_M$ in the first cavity 8.

Arranged over the first polymer membrane 4 is a second polymer substrate 3 with a second cavity 9, the second cavity 9 being arranged over the first cavity 8 and a second polymer membrane 2 being stretched over the second cavity 9. Attached on the second polymer membrane 2, within the second cavity 9, is a second membrane metallization layer 7.

Finally, a third polymer substrate 1 is arranged on the second polymer membrane 2 and forms as it were an upper cover of the pressure sensor device.

As can be seen from FIG. 1a), the first membrane metallization layer 6 can be connected by way of a first conductor track 16 to the side of the cavities 8, 9 and the second membrane metallization layer 7 can be connected by way of a second conductor track 17 to the side of the cavities 8, 9.

The first cavity 8 is connected to a first and a second pressure channel 19, 20, which run in the first polymer substrate 5.

The second cavity 9 is connected to a third pressure channel 10, which runs in the second polymer substrate 3 and is usually connected to a reference pressure $P_R$, in the simplest case atmospheric pressure.

In the state according to FIG. 1b), the pressure channels 19 and 20 are under the same reference pressure PR as the third pressure channel 10, so that the first polymer layer 4 with the first membrane metallization layer 6 located on it is in the undeflected state. A pressure difference $\Delta P=PM-PR$ has the effect, as indicated in FIG. 1c), of deflecting the lower polymer membrane 4 with the first membrane metallization layer 6 located on it. The pressure difference $\Delta P$ may be determined for example by a measurement of the capacitance between the membrane metallization layers 6, 7. As an alternative to this, the height of the second cavity 9 may be configured in such a way that, when there is a corresponding pressure difference $\Delta P$, there is contact between the membrane metallization layer 6, 7, a contact area becoming larger as the pressure difference $\Delta P$ increases. The pressure is then expediently determined from the electrical resistance between the first and second membrane metallization layers 6, 7.

In this case it may be expedient to use a metal or some other material, for example a conductive polymer, a conductive paste or carbon nanotubes (CNTs), for example with a high resistivity, in order to lower the requirements for the evaluation electronics. In the exemplary embodiment as shown in FIGS. 1a) to 1c), the metallization is over the full surface area in both cavities 8, 9.

The necessary structures in the polymer substrates 1, 3, 5 may be produced for example by milling, injection molding or hot stamping. The joining of the polymer layer structure may be performed for example by means of laser transmission welding, ultrasonic welding or adhesive bonding techniques. The metallization may be performed for example by sputtering, inkjet printing or laser-based metallization technologies.

Suitable for example as the polymer substrate are thermoplastics, for example PC, PP, PE, PMMA, COP, COC, etc. Suitable as the elastic membrane are an elastomer, a thermoelastic elastomer, thermoplastics, etc. The metallization of the membrane metallization layers 6, 7 may be performed by metals, such as for example gold, copper, aluminum, etc. However, according to requirements, other materials, such as for example conductive polymer or CNTs, may also be used to increase the resistivity.

Dimensions given by way of example for the exemplary embodiment according to FIGS. 1a) to 1c) are 0.5 to 3 mm thickness of the polymer substrate 1, 3, 5 (25 to 300 μm thickness of the polymer membranes 4, 2; 0.1 to 20 μm thickness of the membrane metallization layers 6, 7, 1 to 1000 μm$^3$ volume of the cavities 8, 9 and 10×10 to 100×100 mm$^2$ as lateral dimensions of the exemplary embodiment as a whole).

In a variant of the evaluation, the only information used is that the two membrane metallization layers 6, 7 come into contact, that is to say a certain minimum pressure is exceeded. The exemplary embodiment may in this case function for example as a pressure switch, in order to establish that a fluid has reached a certain position in the microfluidic system. An advantage of this is that the requirements for the accuracy of the productions are relaxed, and for example the diameter of the cavities 8, 9 does not have to be set very accurately.

Figure 2A:
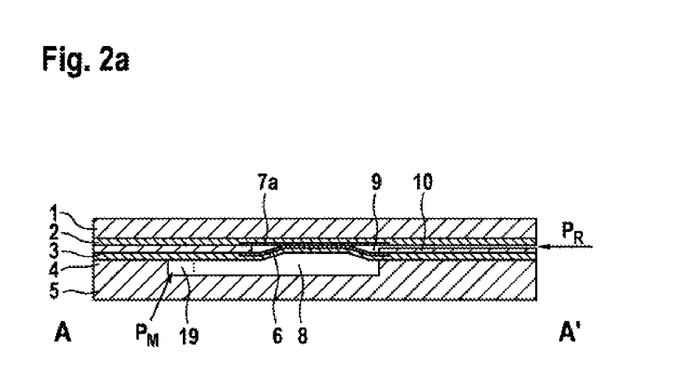
FIGS. 2a),b) show schematic views for the explanation of a polymer layer pressure sensor device according to a second embodiment of the present invention disclosure, specifically FIG. 2a) in cross section along the line A-A' in FIG. 1a) and FIG. 2b) a representation of the structured upper membrane metallization layer 7a in FIG. 2a)
Figure 2B:
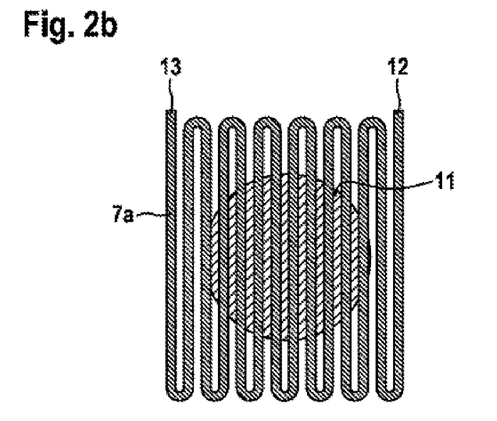

FIGS. 2a),b) are schematic views for the explanation of a polymer layer pressure sensor device according to a second embodiment of the present disclosure, specifically FIG. 2a) in cross section along the line A-A' in FIG. 1a) and FIG. 2b) a representation of the structured upper membrane metallization layer 7a in FIG. 2a).

In the case of the second embodiment according to FIG. 2a),b), the system is configured in such a way that the lower membrane metallization layer 6 comes into contact with the specially structured upper membrane metallization layer 7a when there is upward deflection.

As can be seen from FIG. 2b), the upper membrane metallization layer 7a is structured in a meandering form as a conductor track and has a first and second end 12, 13, between which a resistance can be sensed. Depending on the pressure difference $\Delta P$, there is a contact region 11 of differing size between the lower membrane metallization layer 6 and the upper structured membrane metallization layer 7a, and consequently short-circuits of differing magnitude in the upper membrane metallization layer 7a. Thus, the deflection of the polymer membrane 6 can be sensed by way of a change in resistance between the ends 12, 13 of the upper structured membrane metallization layer 7a, which imposes much lower requirements on external evaluation electronics than a capacitive evaluation.

Figure 3:
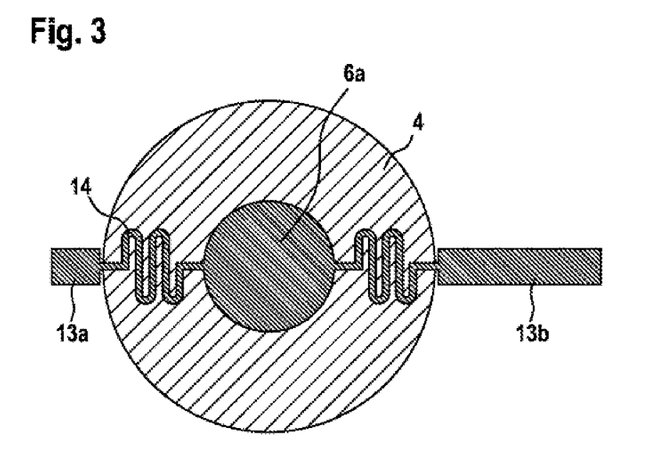
FIG. 3 shows a schematic plan view of a structured lower membrane metallization layer 6a for the explanation of a polymer layer pressure sensor device according to a third embodiment of the present disclosure.

FIG. 3 is a schematic plan view of a structured lower membrane metallization layer 6a for the explanation of a polymer layer pressure sensor device according to a third embodiment of the present disclosure.

In the case of the third embodiment according to FIG. 3, the lower polymer membrane 4 is not metallized over its full surface area, but instead there is provided a central metallization region 6a, which is elastically connected to peripheral metallization regions 13a, 13b by at least one relieving structure 14. In FIG. 3, the freely suspended region of the first polymer membrane 4 is shown hatched. The advantage of this third embodiment is that, by dispensing with full-area metallization of the first polymer membrane 4, an increase in the flexibility of the first polymer membrane 4 is achieved and smaller pressure differences can be detected. In comparison with a straight connection of the membrane metallization 6a, the sensitivity is additionally increased by the relieving structures 14, since they allow themselves to be stretched and compressed more easily. In addition, the geometry of the relieving structures 14 produces restoring forces, so that in the case of an upward deflection no fixed connection between the first polymer membrane 4 and the metallization 6a is necessary.

Figure 4:
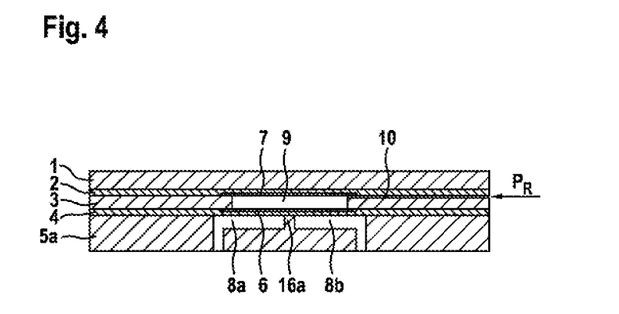
FIG. 4 shows a schematic cross-sectional view for the explanation of a polymer layer pressure sensor device according to a fourth embodiment of the present disclosure.

FIG. 4 is a schematic cross-sectional view for the explanation of a polymer layer pressure sensor device according to a fourth embodiment of the present disclosure.

The exemplary embodiment according to FIG. 4 shows a combination of the polymer layer system pressure sensor device according to the disclosure as shown in FIGS. 1a) to c) with a pinch valve known per se from DE 10 2008 002 336 A1.

In the case of this embodiment, the first polymer substrate 5a has two part-cavities 8a, 8b, which are separated by a web 16a, over which the first polymer membrane 4 with the first membrane metallization layer 6 is stretched. This structure allows the function of the pinch valve to be monitored by an electrical evaluation in real time and thus malfunctions, such as for example a blockage, to be detected at an early time. The pressure channel 10 may in this case be used for example for controlling the pinch valve by way of an external pressure $P_R$.

In an analogous way, the displacement channel of a diaphragm pump may also be equipped on the basis of the shown principle according to the disclosure. In addition to the pure functional control, in this case the pumping rate can also be monitored and determined in real time from the deflection of the first polymer membrane.

Although the present disclosure has been described on the basis of preferred exemplary embodiments, it is not restricted to them. In particular, the materials and topologies mentioned are only given by way of example and are not restricted to the examples explained.

The invention claimed is:

1. A polymer layer system pressure sensor device, comprising: a first polymer substrate with a first cavity; a first polymer membrane stretched over the first cavity and configured to be deflected vertically in dependence on a pressure in the first cavity; a first membrane metallization portion attached on the first polymer membrane above the first cavity and configured to be deflected together with the first polymer membrane in dependence on the pressure in the first cavity; a second polymer substrate arranged over the first polymer membrane and having a second cavity arranged over the first cavity; a second polymer membrane stretched over the second cavity; a second membrane metallization portion attached on the second polymer membrane within the second cavity; and a third polymer substrate arranged over the second polymer membrane, wherein the second cavity is connected to a first pressure channel, configured to run in the second polymer substrate, wherein the first membrane metallization portion and the second membrane metallization portion are configured to come into contact with one another when there is deflection under pressure.

2. The polymer layer system pressure sensor device as claimed in claim 1, wherein the second polymer membrane is not deflectable.

3. The polymer layer system pressure sensor device as claimed in claim 1, wherein:
the first cavity is connected to a second pressure channel and a third pressure channel, and
the second pressure channel and the third pressure channel are configured to run in the first polymer substrate.

4. The polymer layer system pressure sensor device as claimed in claim 1, wherein the first membrane metallization portion is connected by at least one first conductor track to a side of the second cavity, and the second membrane metallization portion is connected by at least one second conductor track to the side of the second cavity.

5. The polymer layer system pressure sensor device as claimed in claim 1, wherein: the first membrane metallization portion includes a part-area central metallization region on the first polymer membrane, and the part-area central metallization region is suspended in the first membrane metallization portion by relieving elements.

6. The polymer layer system pressure sensor device as claimed in claim 1, wherein the second membrane metallization portion is configured as a conductor track such that, when is the first membrane metallization portion and the second membrane metallization portion are brought into contact by deflection under pressure, a resistance between two ends of the second membrane metallization portion is dependent on the pressure in the first cavity.

7. The polymer layer system pressure sensor device as claimed in claim 1, wherein the first cavity includes a first part-cavity and a second part-cavity, which are separated by a web, over which the first polymer membrane is stretched.

8. The polymer layer system pressure sensor device of claim 1, further comprising:
a second pressure channel and a third pressure channel extending horizontally from the first cavity within the first polymer substrate.

9. A method of sensing pressure in a polymer layer system, comprising:
sensing the pressure in a first cavity of a first polymer substrate based on a capacitance between a first membrane metallization portion attached on a first polymer membrane above the first cavity and a second membrane metallization portion attached on a second polymer membrane within a second cavity, wherein
the second cavity is connected to a first pressure channel, configured to run in the second polymer substrate.

10. The method of claim 9, comprising:
introducing a pressure into the first cavity through a second pressure channel extending horizontally from the first cavity within the first polymer substrate, wherein
sensing the pressure comprises vertically deflecting at least one of the second membrane metallization layer and the first membrane metallization layer.

11. A method of sensing pressure in a polymer layer system, comprising:
sensing the pressure in a first cavity of a first polymer substrate based on a resistance of a second membrane metallization layer attached on a second polymer membrane above the first cavity,
wherein the second membrane metallization layer and a first membrane metallization layer, attached on the first polymer membrane above the first cavity, are configured to come into contact with one another when there is deflection under pressure.

12. The method of claim 11, comprising:
introducing a pressure into the first cavity through a first pressure channel extending horizontally from the first cavity within the first polymer substrate, wherein
sensing the pressure comprises vertically deflecting at least one of the second membrane metallization layer and the first membrane metallization layer.

* * * * *

UNITED STATES PATENT AND TRADEMARK OFFICE
CERTIFICATE OF CORRECTION

Page 1 of 1

PATENT NO. : 9,766,144 B2
APPLICATION NO. : 14/239802
DATED : September 19, 2017
INVENTOR(S) : Brettschneider et al.

It is certified that error appears in the above-identified patent and that said Letters Patent is hereby corrected as shown below:

In the Claims

In Column 6, Lines 23-24, Lines 4-5 of Claim 6 should read:

when the first membrane metallization portion and the
second membrane metallization portion are brought into Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*